US008856018B2

(12) United States Patent
Lu et al.

(10) Patent No.: US 8,856,018 B2
(45) Date of Patent: Oct. 7, 2014

(54) METHODS AND SYSTEMS FOR OPTIMIZING PRODUCTION FORECASTS USING STATISTICALLY PRIORITIZED DISCRETE MODELING METHODOLOGY

(75) Inventors: Roberto Francisco-Yi Lu, Bellevue, WA (US); Shankar Sundaram, Seattle, WA (US); Tsao-Feng Wei, Medina, WA (US)

(73) Assignee: The Boeing Company, Chicago, IL (US)

( * ) Notice: Subject to any disclaimer, the term of this patent is extended or adjusted under 35 U.S.C. 154(b) by 868 days.

(21) Appl. No.: 12/210,291

(22) Filed: Sep. 15, 2008

(65) Prior Publication Data

US 2010/0070315 A1    Mar. 18, 2010

(51) Int. Cl.
*G06Q 10/00* (2012.01)
*G06Q 10/06* (2012.01)

(52) U.S. Cl.
CPC .. *G06Q 10/06312* (2013.01); *G06Q 10/063114* (2013.01); *G06Q 10/06311* (2013.01); *G06Q 10/06395* (2013.01); *G06Q 10/063116* (2013.01); *G06Q 10/06* (2013.01)
USPC ........ 705/7.22; 705/7.15; 705/7.13; 705/7.16

(58) Field of Classification Search
CPC ............... G06Q 10/06312; G06Q 10/063114; G06Q 10/06311; G06Q 10/063116
USPC .............. 705/7.22, 7.15, 7.13, 7.16
See application file for complete search history.

(56) References Cited

U.S. PATENT DOCUMENTS

| | | | |
|---|---|---|---|
| 4,852,001 A | 7/1989 | Tsushima et al. | |
| 4,896,269 A | 1/1990 | Tong | |
| 4,956,784 A | 9/1990 | Hadavi et al. | |
| 5,487,144 A * | 1/1996 | Takahashi et al. | 715/835 |
| 5,524,077 A | 6/1996 | Faaland et al. | |
| 5,548,506 A * | 8/1996 | Srinivasan | 705/7.15 |
| 5,559,710 A | 9/1996 | Shahraray et al. | |
| 5,721,686 A | 2/1998 | Shahraray et al. | |
| 5,918,226 A * | 6/1999 | Tarumi et al. | 1/1 |
| 6,473,721 B1 | 10/2002 | Chacon et al. | |
| 6,546,364 B1 * | 4/2003 | Smirnov et al. | 703/22 |
| 6,571,215 B1 * | 5/2003 | Mahapatro | 705/7.12 |

(Continued)

OTHER PUBLICATIONS

Lu et al, Manufacturing Process Modeling of Boeing 747 Moving Line Concepts, 2002, Proc. of the 2002 Winter Simulation Conference, pp. 1041-1045.*

(Continued)

*Primary Examiner* — Justin M Pats
*Assistant Examiner* — Ivan R Goldberg
(74) *Attorney, Agent, or Firm* — Armstrong Teasdale LLP

(57) ABSTRACT

A computer-based method for dynamic path regeneration in a production environment as a function of stochastic event-driven parameters and constraints is described. The method includes examining existing status codes, for a plurality of remaining production jobs, to determine a current status for a production unit, applying at least one of predecessor relationships and successor relationships for the remaining production jobs to the existing status codes, analyzing historical job performance statistics for a number of previous production units based on production job performance data associated with the previous production units, and providing a user interface that depicts the remaining production jobs in order of criticality, the order of criticality determined based on the existing status codes, the at least one of predecessor relationships and successor relationships, and the analysis of the historical job performance statistics.

15 Claims, 20 Drawing Sheets

(56) References Cited

U.S. PATENT DOCUMENTS

| | | | |
|---|---|---|---|
| 6,571,391 B1 | 5/2003 | Acharya et al. | |
| 7,117,162 B1* | 10/2006 | Seal et al. | 705/7.15 |
| 7,233,405 B2 | 6/2007 | Fromherz | |
| 7,289,966 B2 | 10/2007 | Ouchi | |
| 7,299,244 B2 | 11/2007 | Hertling et al. | |
| 7,506,302 B2* | 3/2009 | Bahrami | 717/100 |
| 2003/0216951 A1* | 11/2003 | Ginis et al. | 705/8 |
| 2005/0022187 A1* | 1/2005 | Park | 718/100 |
| 2005/0108074 A1* | 5/2005 | Bloechl et al. | 705/8 |
| 2006/0037018 A1 | 2/2006 | Fang et al. | |
| 2006/0288346 A1* | 12/2006 | Santos et al. | 718/102 |
| 2007/0067196 A1* | 3/2007 | Usui | 705/8 |
| 2007/0143758 A1 | 6/2007 | Coppinger et al. | |
| 2007/0185754 A1* | 8/2007 | Schmidt | 705/9 |
| 2008/0052139 A1* | 2/2008 | Long | 705/7 |
| 2008/0059967 A1* | 3/2008 | Matsui et al. | 718/102 |
| 2008/0313024 A1* | 12/2008 | Kunichika et al. | 705/11 |

OTHER PUBLICATIONS

Wang, "Applying cluster identification algorithm and simulation to generate probabilistic network schedules for design projects," 2005, Construction Management and Economics, vol. 23, pp. 199-213.*

Morris, "The Wiley Guide to Managing Projects," 2004, John Wiley & Sons, pp. 20-22.*

Eden, "The Role of Feedback Dynamics in Disruption and Delay on the Nature of Disruption and Delay (D&D) in Major Projects," 2000, The Journal of the Operational Research Society, vol. 51, No. 3, pp. 291-300.*

* cited by examiner

METHODS AND SYSTEMS FOR OPTIMIZING PRODUCTION FORECASTS USING STATISTICALLY PRIORITIZED DISCRETE MODELING METHODOLOGY

BACKGROUND

The field of the disclosure relates generally to production forecasting, and more specifically, to methods and systems for optimizing production forecasts using statistically prioritized discrete modeling methodology.

Generally, existing production lines and final assembly areas were not originally designed to meet the rapid turn-around times that permeate today's production environments. However, knowledgeable teams of people have managed to implement efficient methods for achieving most of the requirement associated with a rapid. However, some areas within a production enterprise still require improvement. One example is the functional test areas associated with aircraft manufacture and delivery. The extended flow time in the functional test areas often require additional inventory and may influence delivery schedules since most functional test jobs are directly related to other installation jobs.

The tasks in a functional test area of an aircraft manufacturing enterprise currently do not have firm predecessor and/or successor relationships for and among the individual tasks. As a result, a major problem exists in that there is no tool that exists that will dynamically re-schedule these functional test jobs in a very fast fashion. Starting times, durations, and ending times of most functional jobs, including those associated with the functional test areas mentioned above, vary greatly due to the dynamic nature of the production environment.

One existing method is to manually adjust job schedules by doing a cut and paste within computer-generated "bar-charts". These bar-charts are a representation of the Gantt chart. Currently, utilization of manually and computer-generated Gantt charts align the several tasks of a production environment. However, these procedures are not adaptable with the speed, agility, and complexity of, for example, an aircraft production system.

Such existing solutions often require that many engineers and schedulers spend close to one day or longer to re-generate a new set of "bar-charts" based on the changes in the production environment. The disadvantage of the existing solutions is that they are a bit too slow and also require too much manual input. The limitation of the existing bar-chart solution is that it can not take advantage of moving some of the jobs that have a range of possible execution times. Finally, the existing bar-chart solution cannot detect which jobs are more important than others in the immediate future, without a very time consuming exercise of cross referencing among, for example, teams of people on the shop floor.

BRIEF SUMMARY

In one aspect, a computer-based method for dynamic path regeneration in a production environment as a function of stochastic event-driven parameters and constraints is provided. The method includes examining existing status codes, for a plurality of remaining production jobs, to determine a current status for a production unit, applying at least one of predecessor relationships and successor relationships for the remaining production jobs to the existing status codes, analyzing historical job performance statistics for a number of previous production units based on production job performance data associated with the previous production units, and providing a user interface that depicts the remaining production jobs in order of criticality, the order of criticality determined based on the existing status codes, the at least one of predecessor relationships and successor relationships, and the analysis of the historical job performance statistics.

In another aspect, a system is provided that includes at least one computer configured to execute a computer program that includes a simulation model and a database. The database contains data relating to active and historical production jobs including predecessor and successor relationships among the active production jobs, production job schedules, production job task durations, and production job task dependencies. The simulation model operates to cause the computer to examine the data relating to the active production jobs to determine a current status for at least one production unit, apply the predecessor and successor relationships to the active production jobs for the at least one production unit, analyze the data relating to historical production jobs for a number of previous production units, utilize the current status, the predecessor and successor relationships, and the historical production job data to determine which of the active production jobs are most critical to the overall completion date of the production unit, and present the determination to the user of the computer.

DETAILED DESCRIPTION

As further described herein, the described embodiments provide a mechanism for generating optimized production schedule forecasts that depict dynamic critical path re-configuration with solutions to meet near term floating deadlines. The floating deadlines are typically per given group of jobs, per given resource limits, per line or serial numbers, and among all active line or serial numbers in the final assembly area. More specifically, the embodiments utilize an algorithm to analyze existing production data with considerations of both hard and flexible predecessor and/or successor relationships among all current jobs. Upon completion of the analysis, new priorities of jobs with new critical paths are dynamically presented using efficient data movement and job sequencing algorithms in a large scale production system. The embodiments enable people in the final stages of a push type dynamic production environment to have visibility of and quickly take action to statistically re-prioritize jobs based on re-configured critical paths. These re-configured critical paths being generated on the fly based on a current production scenario using the disclosed algorithm and methods in a discrete event simulation. While described in terms of an aircraft production environment, it should be understood that the embodiments described herein are not so limited, and are believed to be applicable to many production applications.

As mentioned above, existing solutions to production environment scheduling problems is to use rule-of-thumb and trade knowledge to out-smart the dynamic nature of the production system. The currently utilized bar charts illustrate, for example, jobs per person without any cross reference among those jobs in a group or among groups. To illustrate further, the bar charts were likely generated with consideration of cross referencing; but after being printed in paper form, the dynamics of job status and re-scheduling for a new critical group of jobs becomes labor intensive and nearly impossible to accomplish due to the intense production demands.

Figure 1:
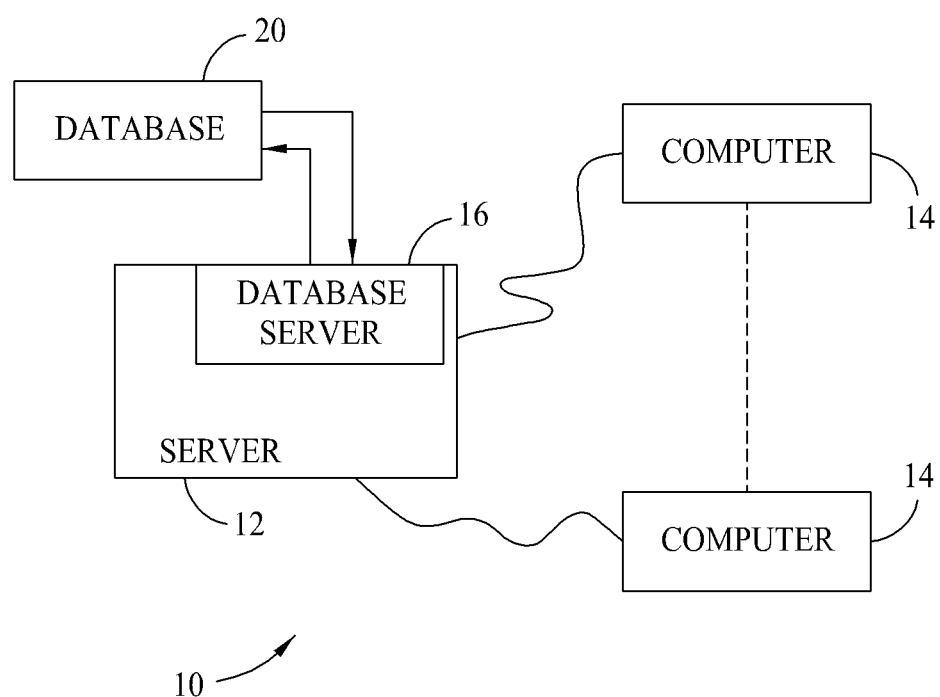
FIG. 1 is a simplified block diagram of an exemplary server-client system.

FIG. 1 is a simplified block diagram of an exemplary system 10 including a server system 12, and a plurality of client sub-systems, also referred to as client systems 14, connected to server system 12. Computerized modeling and grouping tools, as described below in more detail, are stored in server 12, and can be accessed by a requester at any one of computers 14. In one embodiment, client systems 14 are computers including a web browser, such that server system 12 is accessible to client systems 14 using the Internet. Client systems 14 are interconnected to the Internet, or alternatively to an Intranet, through many interfaces including a network, such as a local area network (LAN) or a wide area network (WAN), dial-in-connections, cable modems, and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of matters, as described below in greater detail. In one embodiment, centralized database 20 is stored on server system 12 and can be accessed by potential users at one of client systems 14 by logging onto server system 12 through one of client systems 14. In an alternative embodiment, database 20 is stored remotely from server system 12 and may be non-centralized.

Figure 2:
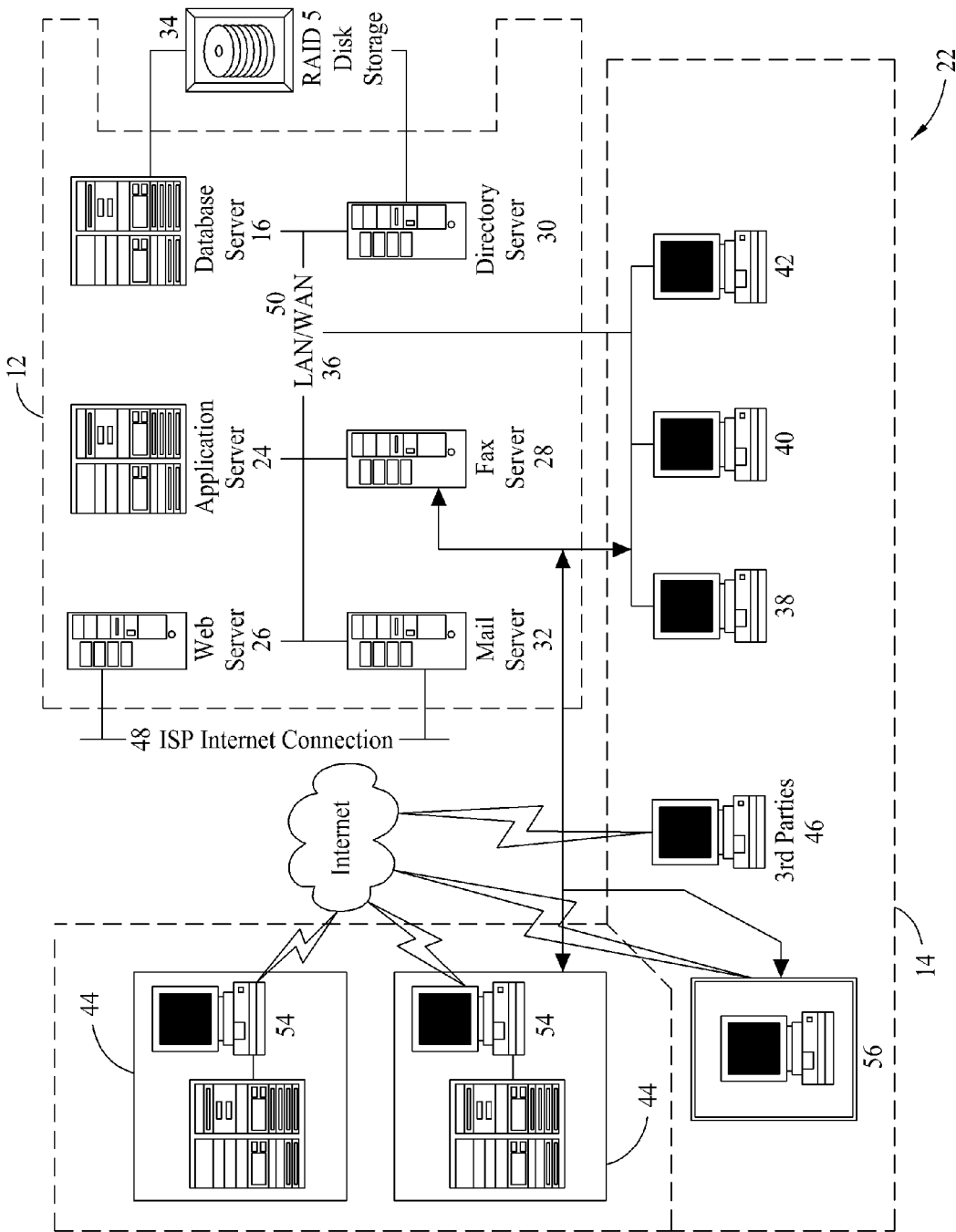
FIG. 2 is an expanded block diagram of a computer network.

FIG. 2 is an expanded block diagram of an exemplary embodiment of a system 22. System 22 is but one example of a suitable computing environment and is not intended to suggest any limitation as to the scope of use or functionality of the present disclosure. Neither should the system 22 be interpreted as having any dependency or requirement relating to any one or combination of components illustrated herein. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 (which includes database 20) is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 using an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and to third parties, e.g., customers/contractors 46 using an internet service provider (ISP) Internet connection 48. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 50, local area network 36 could be used in place of WAN 50.

In the exemplary embodiment, any authorized individual having a workstation 54 can access system 22. At least one of the client systems includes a manager workstation 56 located at a remote location. Workstations 54 and 56 are personal computers having a web browser. Also, workstations 54 and 56 are configured to communicate with server system 12. Furthermore, fax server 28 communicates with remotely located client systems, including a client system 56 using a telephone link. Fax server 28 is configured to communicate with other client systems 38, 40, and 42 as well.

Figure 3:
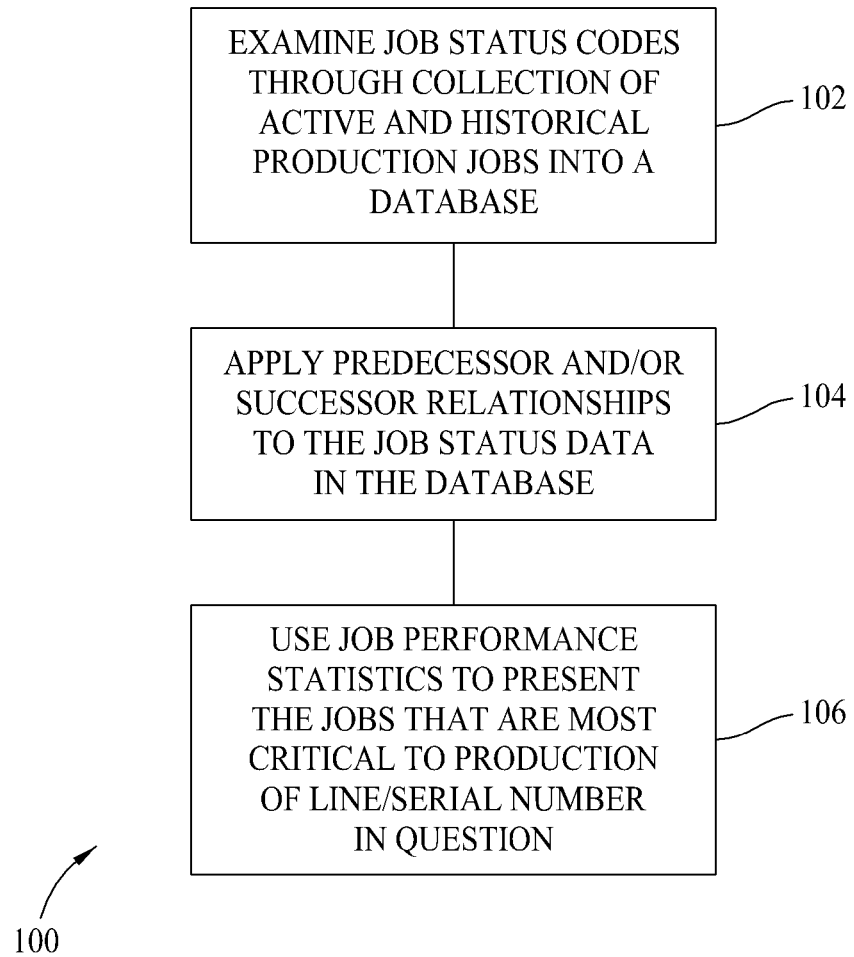
FIG. 3 is a flowchart that illustrates a method for dynamic critical path regeneration as a function of stochastic event-driven parameters and associated constraints.

Utilizing the systems of FIGS. 1 and 2, an ability to address production environment scheduling problems according to the embodiments described herein is provided. For example, FIG. 3 is a flowchart 100 that illustrates a method for dynamic critical path regeneration as a function of stochastic event-driven parameters and associated constraints that might be run on the systems of FIGS. 1 and 2. More specifically referring to flowchart 100, all existing job status codes are examined 102, for example, by collecting all active and historical production jobs into a database with an automatic refreshing mechanism that dynamically updates the database to reflect the current production status. Predecessor and/or successor relationships are applied 104, for example, the dynamically updated data in the database is dynamically accessible to a discrete event simulation model. In one simulation model embodiment, there is an algorithm that processes jobs based on their predecessor and/or successor relationships as well as their existing status.

Historical job performance statistics are used 106, for example, from the previous 50 line or serial numbers to present results that depict which jobs are most critical, as further described below. The information is customized to each mechanic/electrician/supervisor without the convoluted traditional paper processes that are currently in place. More generally, customizing the user interface presented to the user based on their production job responsibilities. The user front end of the presented finding is independent from the time consuming processes associated with the described event simulation. Speed of the simulation is detached from the data presentation, at least in part due to the database and the production data movement scheme mentioned above with respect to the examination 12 mentioned above.

The described embodiments transform the tedious, labor intensive, rule-of-thumb rough estimating/job shuffling of the past into an intelligent, rule based process which incorporates historical data and statistical analysis. The embodiments involve the use of algorithms to dynamically present which jobs are most critical to the overall completion date of a specific line or serial number, and accomplish this presentation task with more ease and speed than currently available methods. In one embodiment, the modeling and algorithms are capable of forecasting consequences to the completion date of a specific production unit based on available resources and production job status codes in addition to identifying potential risks to the completion date of a specific production unit in the form of critical production jobs.

In certain application, the presentation of the results provides visibility to areas where opportunities for improvements exist in the production system. The ability of having a rule based approach to dynamically identify daily efficiency improvement opportunities is more beneficial than today's method of relying on prior knowledge to identify what are the current urgencies.

Figure 4:
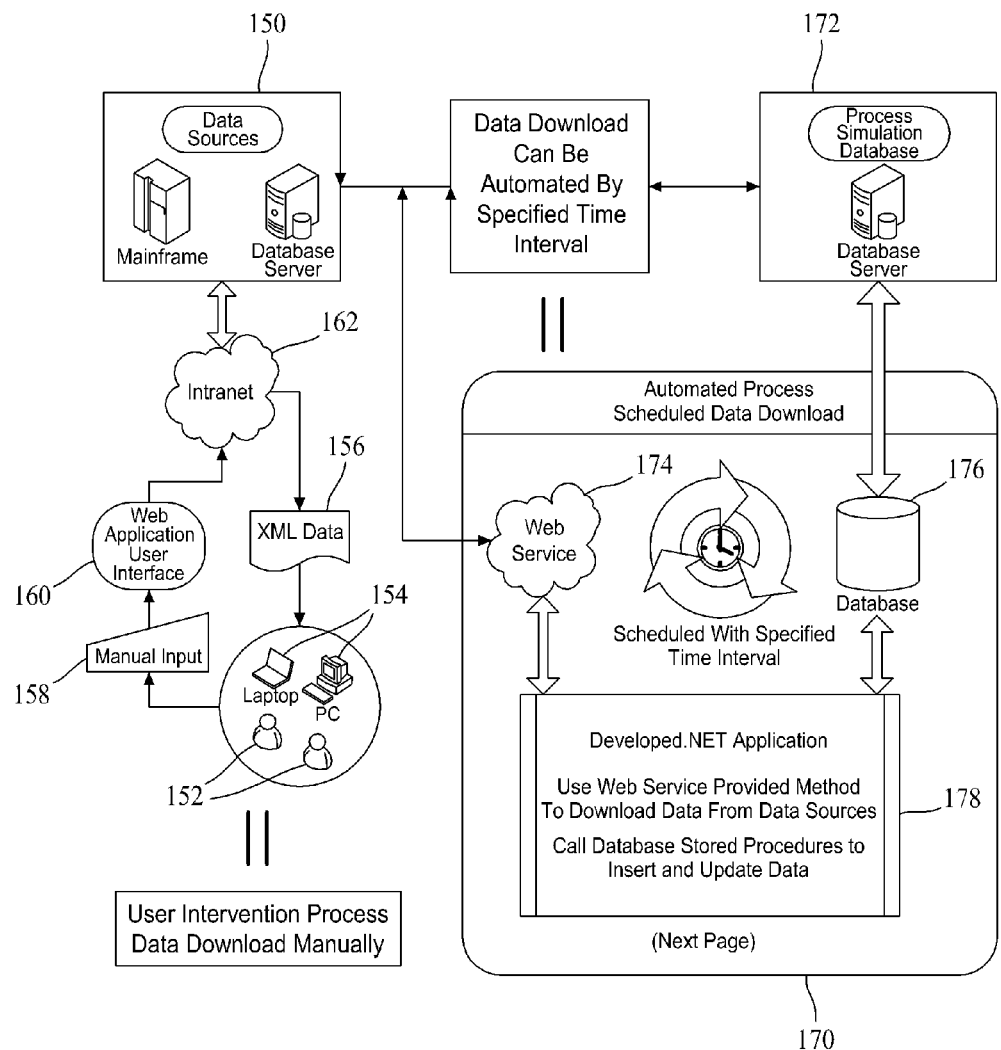
FIG. 4 is an overview of the elements involved in efficient data movement.

FIG. 4 is an illustration that provides an overview of elements involved in efficient data movement. A data source element 150 indicates existing production data storage. To download data manually, data sources are accessed by users 152 using computers 154. The data is accessed as either XML data 156, or via manual input 158 into a web application user interface 160. Either way, the computers 154 generally access the data source element 150 via an intranet 162 or other network system. Alternatively, as shown by automated process 170, data can be downloaded automatically from a process simulation database 172 based on a user defined schedule and/or a time interval. To gather data, in this case production related data, automatically, a web service 174 provides one method to download data from data sources 150. Alternatively, a call to a database 176 that includes stored procedures is used to insert and update production related data. The web service 174 call and calls to database 176 are provided through application 178.

Figure 5:
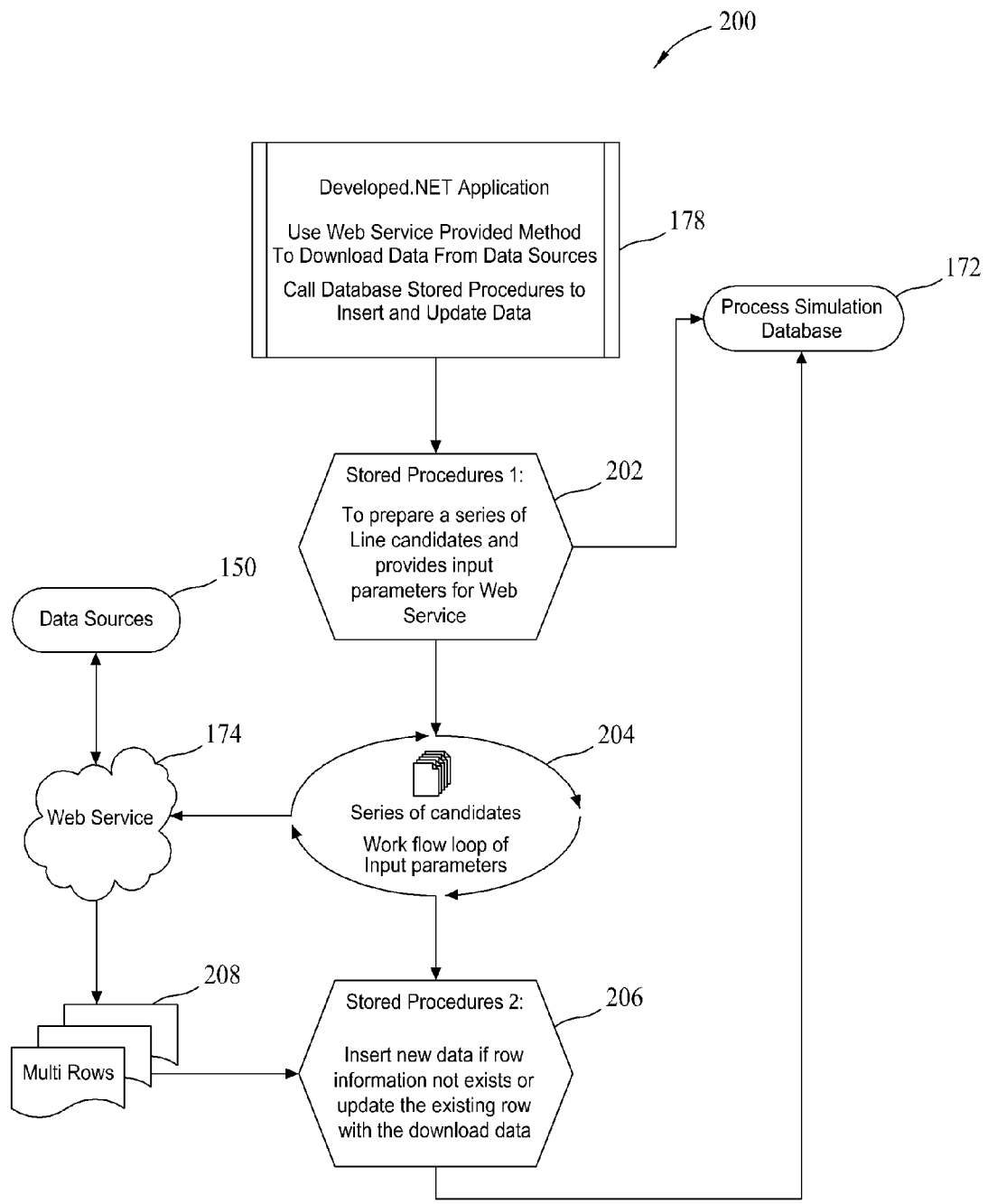
FIG. 5 is a flowchart showing how an application uses web services to store data efficiently.

FIG. 5 is a flowchart 200 illustration showing how application 178 uses web services 174 are used as a method to store data efficiently. The method ensures that all existing production job data within the data sources 150 as well as newly revised data is stored systematically. Referring to the flowchart 200, application 178 causes stored procedure one 202 to execute, which is the preparation of a series of line/serial number candidates, and the providing of input parameters for the web services 174. The series of candidates is processed 204 through a work flow loop of input parameters, and a second stored procedure 206 is executed for the insertion of new production data into rows 208 or the update of existing rows 208 of production data.

Figure 6:
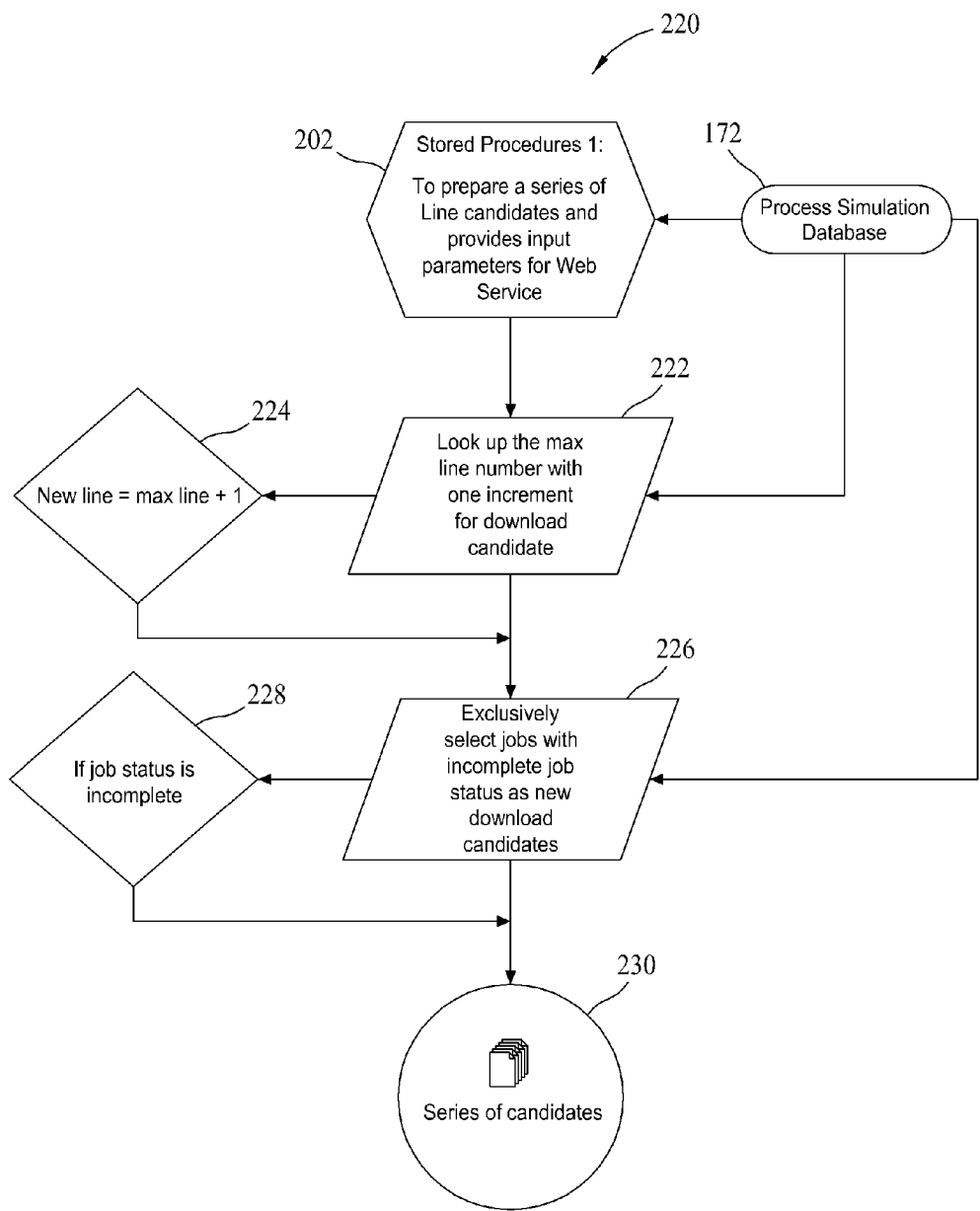
FIG. 6 is a flowchart illustration of a procedure for refreshing of production related data.

FIG. 6 is a flowchart 220 that provides additional illustration of stored procedure one 202 and how to refresh the production related data without getting a whole new set of production related data every time there is an update. Specifically, to prepare a series of line/serial number candidates, and input parameters for the web services 174, the maximum line/serial number is looked up 222 and incremented by one for a download candidate. If the new line is equal 224 to the maximum line number plus one, then jobs with an incomplete job status 228 are exclusively selected 226 as new download candidates and stored in the database as the series of line/serial number candidates 230.

Figure 7:
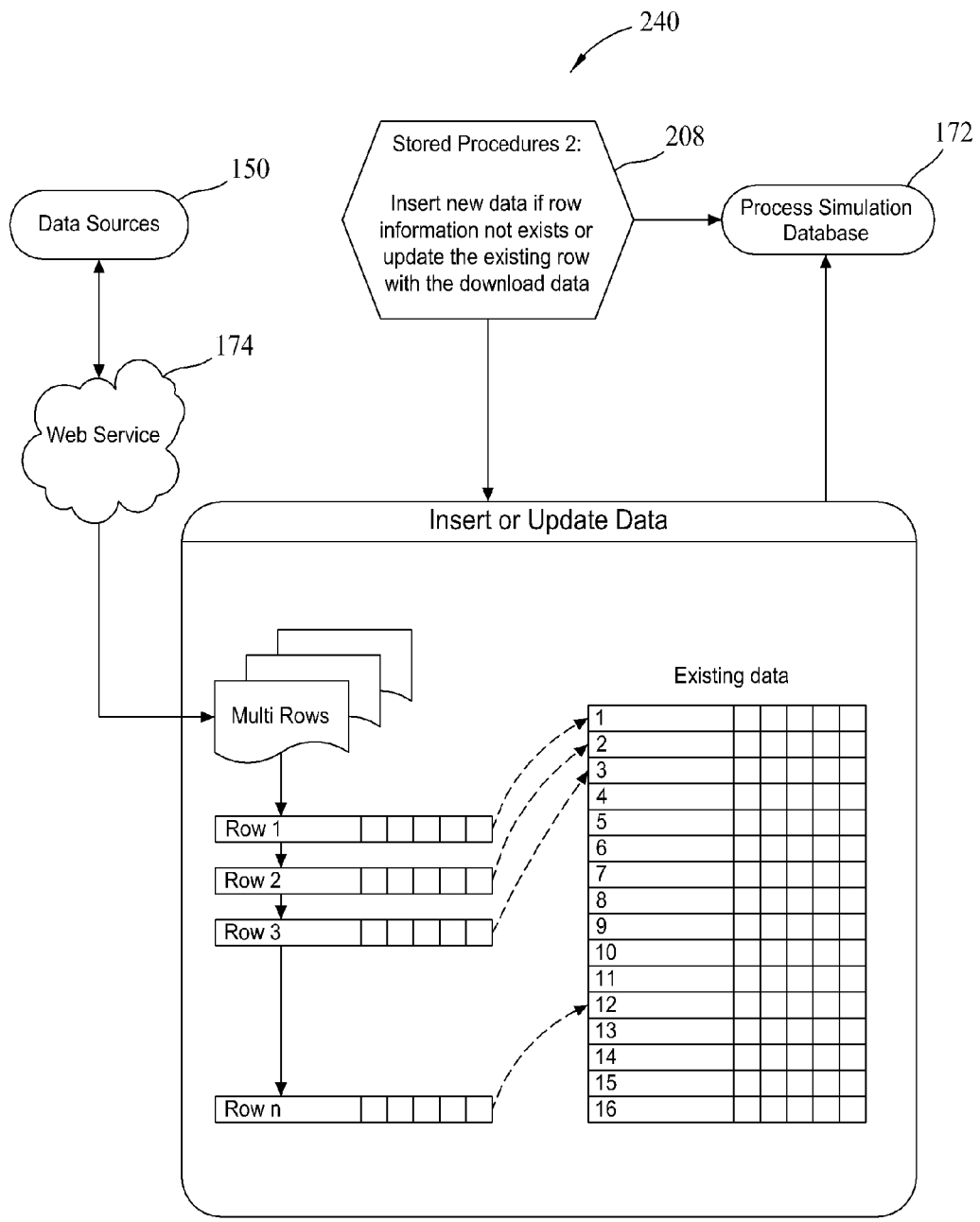
FIG. 7 is a flowchart illustration of a procedure for inserting multiple rows of data into a database.

FIG. 7 is a flowchart 240 that provides additional illustration of stored procedure two 208 and how to insert multiple rows of data into the database 172. Specifically, only rows that have updated data are inserted into the database of existing data. FIGS. 3 through 7 present features including a web service, a SQL database, and a series of automated methods to gather data very efficiently and quickly.

Figure 8:
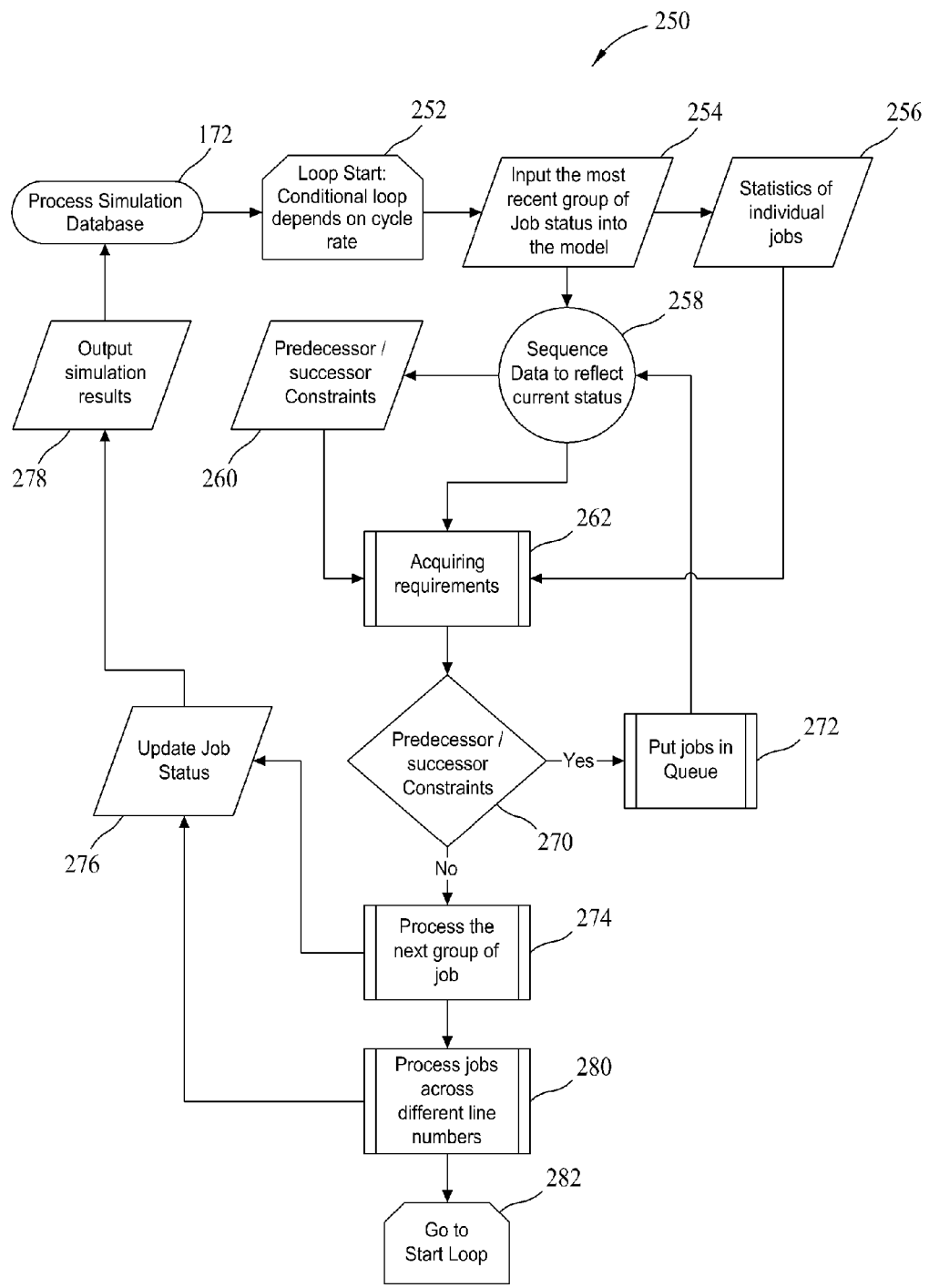
FIG. 8 is a flowchart representing major elements of a production data movement scheme, a simulation method, and an associated algorithm.

FIG. 8 is a flowchart 250 that represents major elements of a production data movement scheme and a simulation method and associated algorithm. The simulation method does not only process a routine set of tasks based on a given set of fixed flow diagrams it also searches for the shortest total time to process all jobs in the system. In regard to data movement, all active and historical production jobs are collected into a database with an automatic refreshing mechanism that dynamically updates the database to reflect the current production status. Via the simulation algorithm, the data is dynamically accessible to a discrete event simulation model. In the simulation model, there is one algorithm for the processing of production jobs based on their predecessor/successor relationships as well as their existing status. In one embodiment, the possible job status codes include: Comp=Job is Complete; CANC=Job is Canceled; PS=Production Start; IDLE=Job is Idle, WIP=was on job, but there has been hours of inactivity; PSWD=Production Started With Delay; OPEN=Job is queued but not started; IFIR=In Final Inspection.

Hence, in the simulation, the algorithm is operable to determine the best next possible groups of jobs to start. For example if one mechanic has started five jobs while five other team members have done the same, then it is possible to have up to 25 jobs open in the system. The algorithm identifies which jobs among those 25 are the most important and need to be completed first. A new critical path will then be created on the fly to present higher priority jobs per mechanic per job category and/or per team.

Now referring to flowchart 250, and beginning at loop start 252, the most recent group of job status data is input 254 into the above mentioned algorithm. Statistics of individual jobs are determined 256. The job status data is sequenced 258 to reflect a current status, and predecessor/successor constraints are considered 260 along with the determined 256 statistics to fulfill acquiring requirements 262. If the predecessor/successor constraints are met 270 the production jobs are put 272 into a queue. If the predecessor/successor constraints are not met 270, the next group of production jobs are processed 274 and the production job status is updated 276 and simulation results are output 278. In addition, after the production jobs are processed 274, they are processed 280 across different line/serial numbers. Afterwards, the process may be repeated as indicated by go to start loop 282, indicating the process may again initiate at loop start 252. These portions of the flowchart 250 indicate that the same set of common processes in a simulation model that runs on one computer can be utilized to handle multiple sets of jobs from multiple units of final products, such as airplanes in the final assembly stages.

Figure 9:
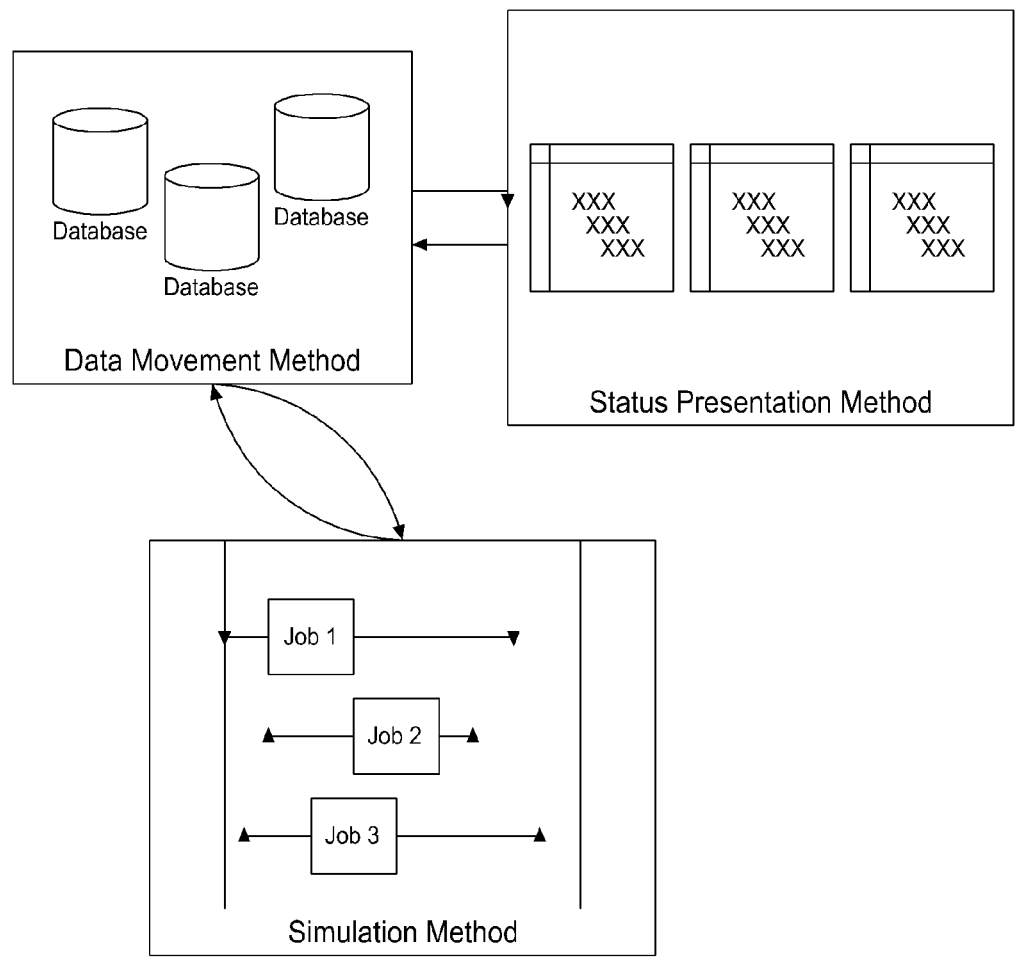
FIG. 9 is a diagram that illustrates the relationships between a data movement method, a status presentation method, and a simulation method.

FIG. 9 is a diagram 300 that illustrates the relationships between the above described processes including the data movement method 302, the status presentation method 304, and the simulation method 306, which are represented at a high level. In regard to presenting findings to the production community, information is customized to each mechanic/electrician/supervisor without the convoluted traditional paper processes that are currently in place. Another feature is that the user front end of the presented finding is independent from the data gathering and simulation processes. As a result, the speed of the simulation is detached from the data presentation, due to the production data movement scheme described above.

Figure 10:
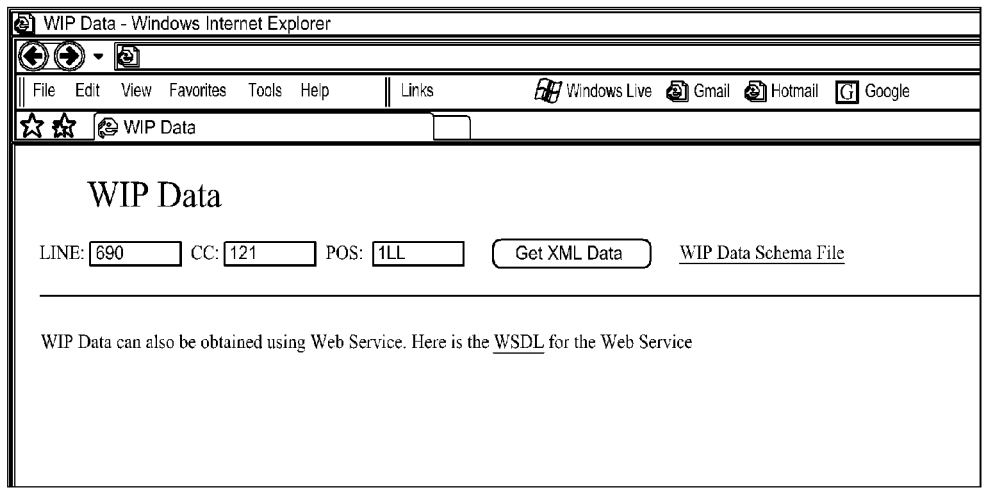
FIG. 10 is a computer screen copy relating to an online data querying method.

The described embodiments elaborate the existing online data querying method through automation, as seen in the computer screen copy 300 of FIG. 10. More specifically, a user is able to enter a line number or serial number associated with one or more production jobs and determine the status of jobs associated with the production of the entered line or serial number.

Figure 11:
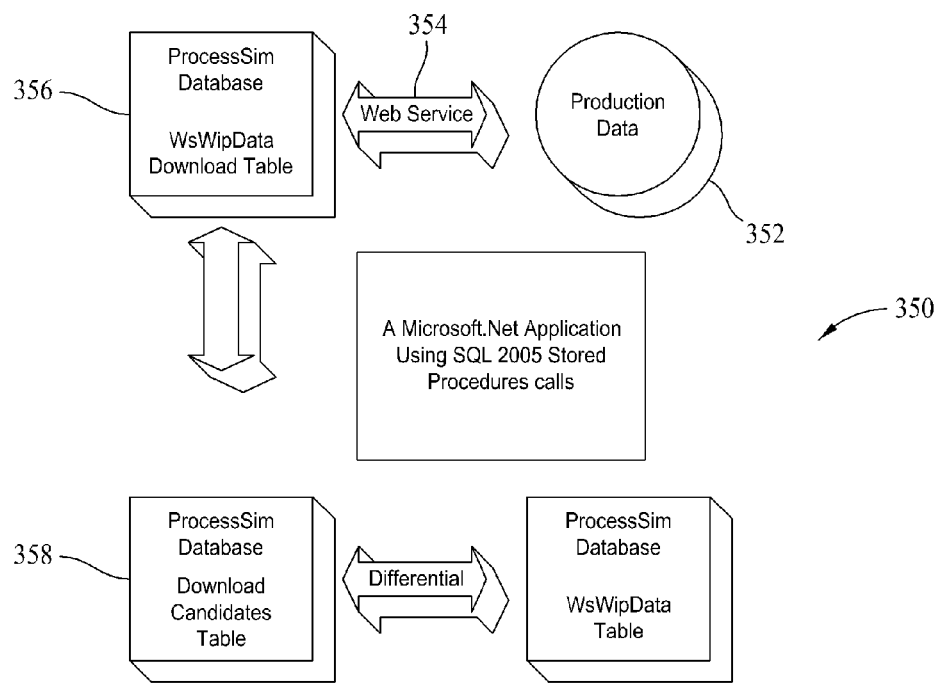
FIG. 11 is a data flow diagram illustrating automatic collection of production data associated with one or more serial or line numbers.

When there is a new line of data available that is associated with one or more serial or line numbers, it is automatically collected. This process is represented in the data flow diagram 350 of FIG. 11. More specifically, production data 352 is gathered using a web service 354, for example, and provided to a process simulation database 356 which includes a data download table. The production data is analyzed and candidates for update are determined and stored in a download candidates table 358. Differentials 360 between in the production data are determined and stored in the process simulation database 362 in a data table. Users access the current status of production jobs via this data table.

Figure 12:
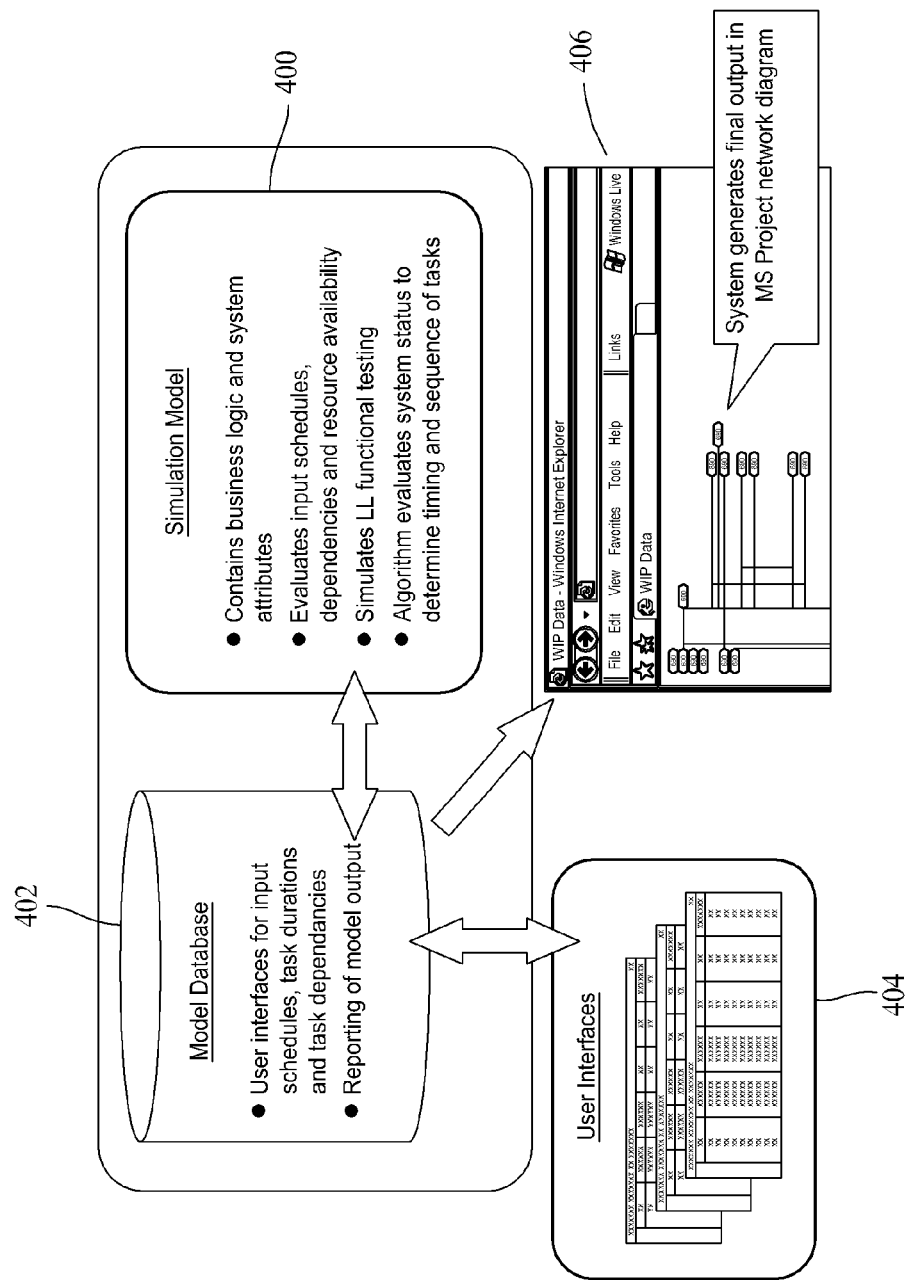
FIG. 12 is diagram providing an overview of a simulation model.

FIG. 12 shows an overview of the simulation model 400 described herein. Specifically, the simulation model 400 reads from and writes to the model database 402 directly without slowing down the result presentation on the web page represented in FIG. 12 by user interfaces 404 and network diagram 406. As illustrated by FIG. 12 and described elsewhere herein, the simulation model 400 contains business logic and system attributes, evaluates input schedules, dependencies and resource availability, simulates functional testing, and includes an algorithm that evaluates system status to determine timing and sequencing of tasks. The model database 402 includes data and user interfaces relating to predecessor and successor relationships among the active production jobs, production job schedules, production job task durations, and production job task dependencies as well as user interfaces for the reporting of simulation model output.

Figure 13:
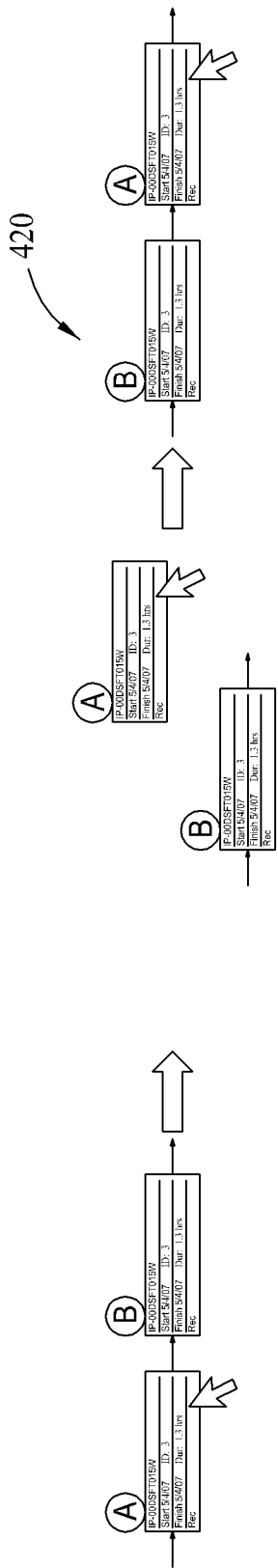
FIGS. 13 and 14 are a workflow diagrams illustrating that jobs can be processed either in sequence, reverse order, and/or in parallel if the job predecessor and successor relationships are maintained.
Figure 14:
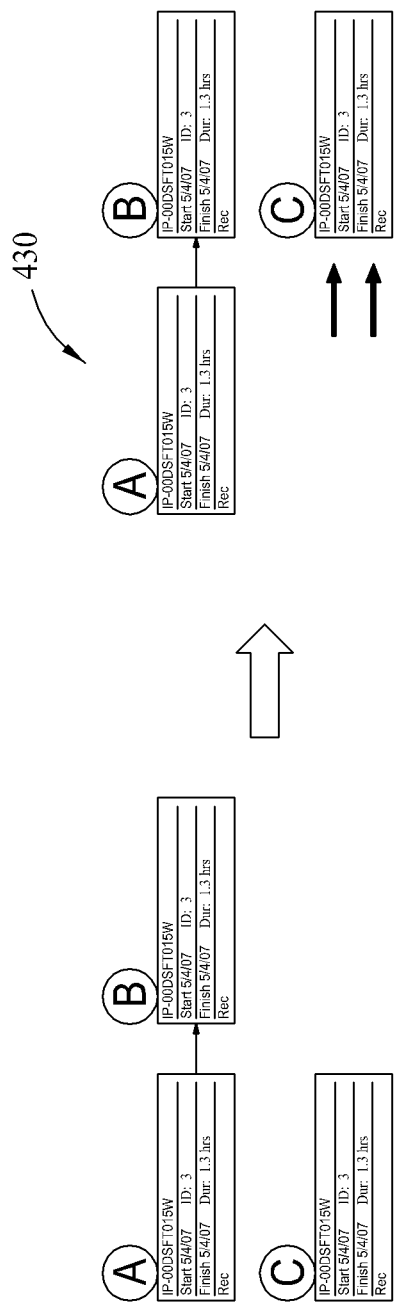

FIGS. 13 and 14 are workflow diagrams, 420 and 430 respectively, illustrating that the simulation method performed by the simulation model 400 can break loose of a pre-determined network diagram among jobs to process them either in sequence and/or in parallel given that the job predecessor and successor relationships are maintained. Specifically, in diagram 420, while Job A is generally scheduled to be completed before Job B, it is possible that they can be partially overlapped, or Job B may be completed before Job A. As such Job B is not dependent on the completion of Job A.

Figure 15:
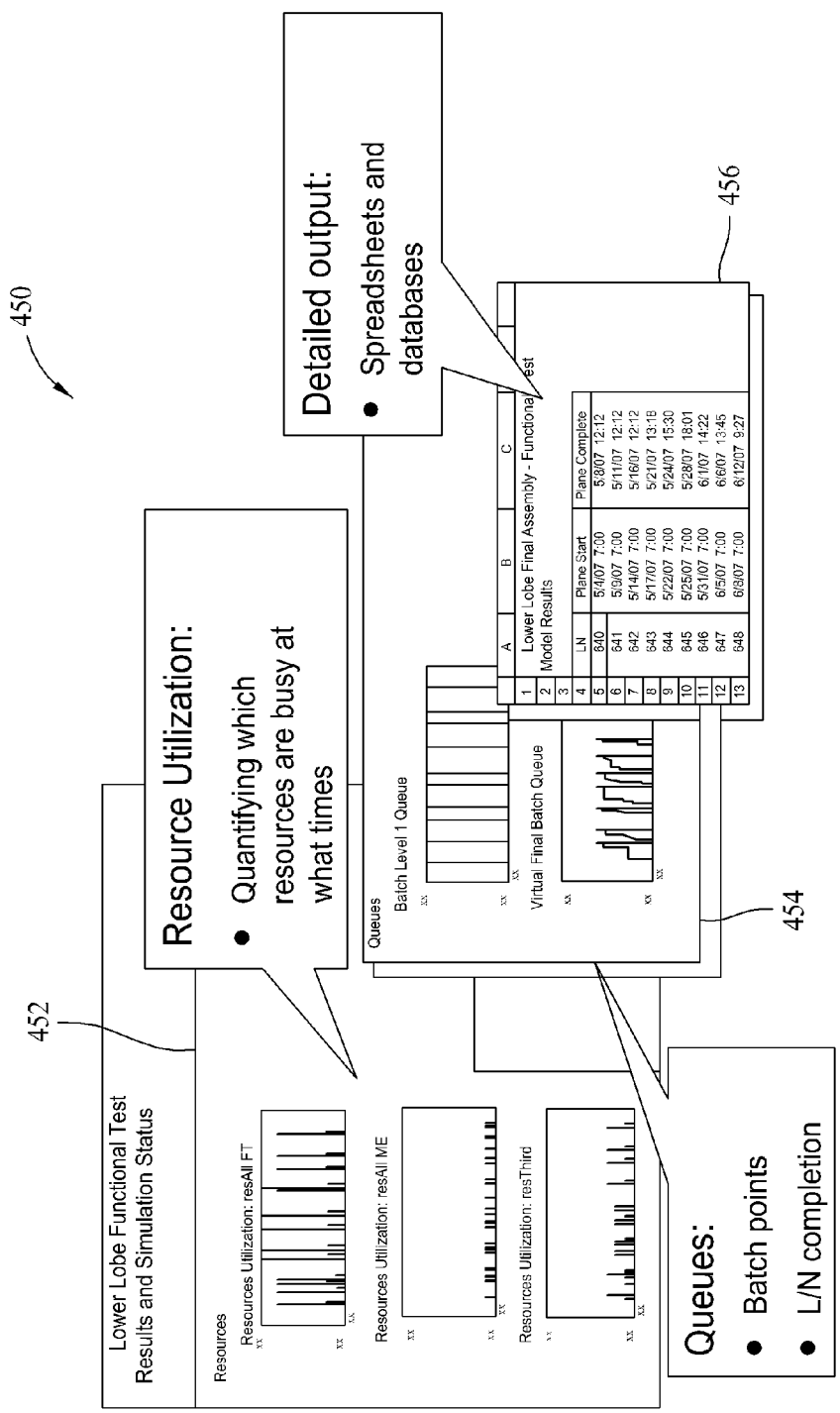
FIG. 15 is a diagram illustrating simulation results.

FIG. 15 is a diagram 450 that illustrates several simulation results. Specifically, simulation results in showing utilization of key resources 452 such as quantifying which resources are busy at what times, queuing 454 including batch points and line/serial number completion, and a detailed output 456 in the form of spreadsheets and databases.

The above described figures describe a production job simulation mode that has the following features, including, but not limited to, an ability to analyze how precedence network is affected if certain production jobs are delayed, an ability to decide how labor should be re-allocated based on delayed job, an option to test various scenarios for placement of traveling jobs, a capability to add more job packages, and an ability to plan ahead when a delay is anticipated. The described system incorporates a unique job prioritization algorithm that considers planned rollout schedules, resource availability and job dependencies to recommend a sequence of tasks for each line/serial number being produced in a production facility.

Figure 16:
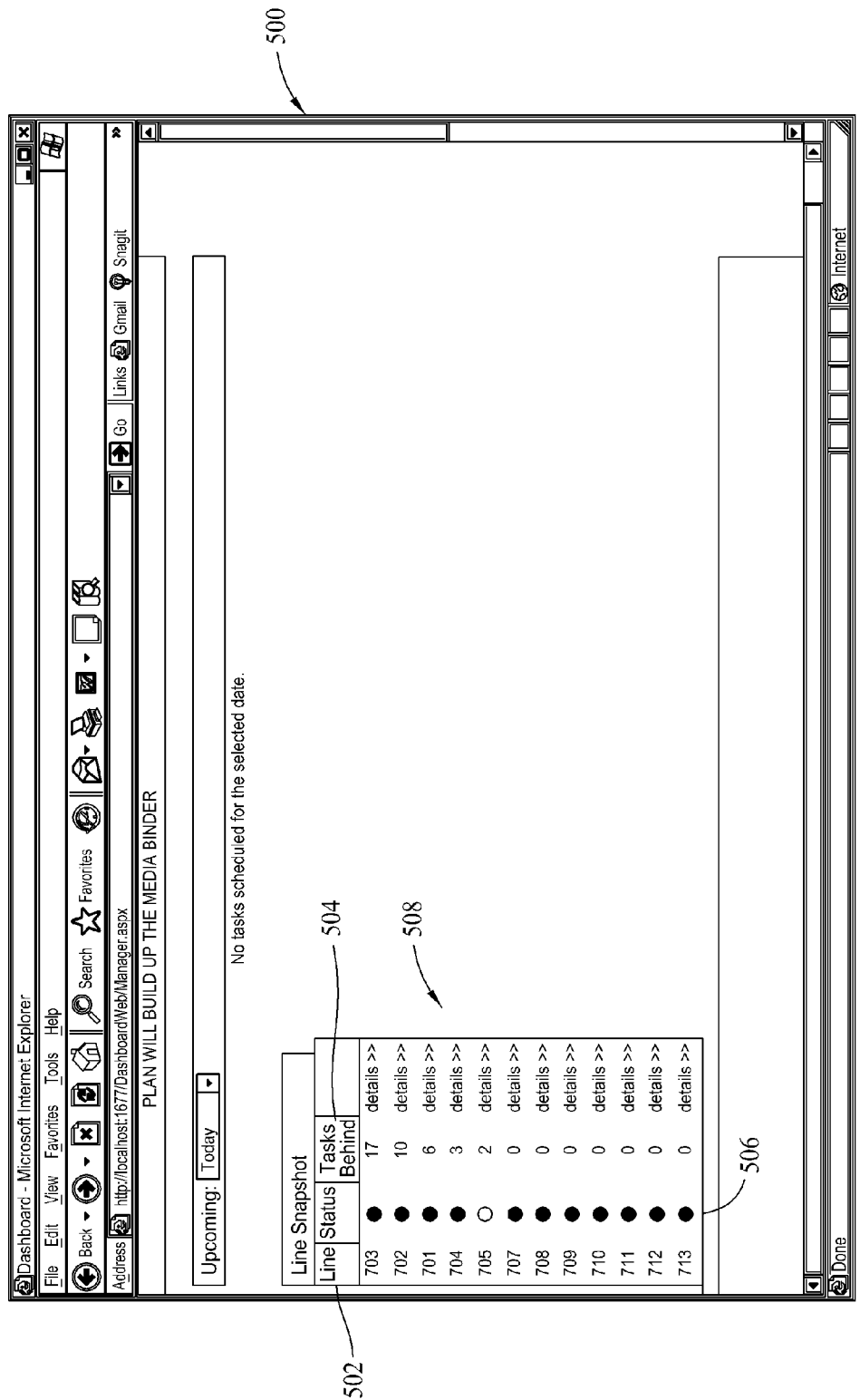
FIG. 16 is a depiction of a web browser interface that shows a status of tasks/jobs associated with specific line/serial numbers.

FIG. 16 is a depiction of a web browser interface 500 that shows which line/serial numbers 502 have how many tasks/jobs 504 that are behind schedule through incorporation of a status light renditions 506. Status light renditions 506 may be presented in multiple colors. For example and in one embodiment, a status light rendition colored green indicates no tasks are behind schedule, a status light rendition colored yellow indicates several tasks are behind schedule, and a status light rendition colored red indicates too many tasks are behind schedule. A user is able to select a link 508 to access additional details for a specific line/serial number.

Figure 17:
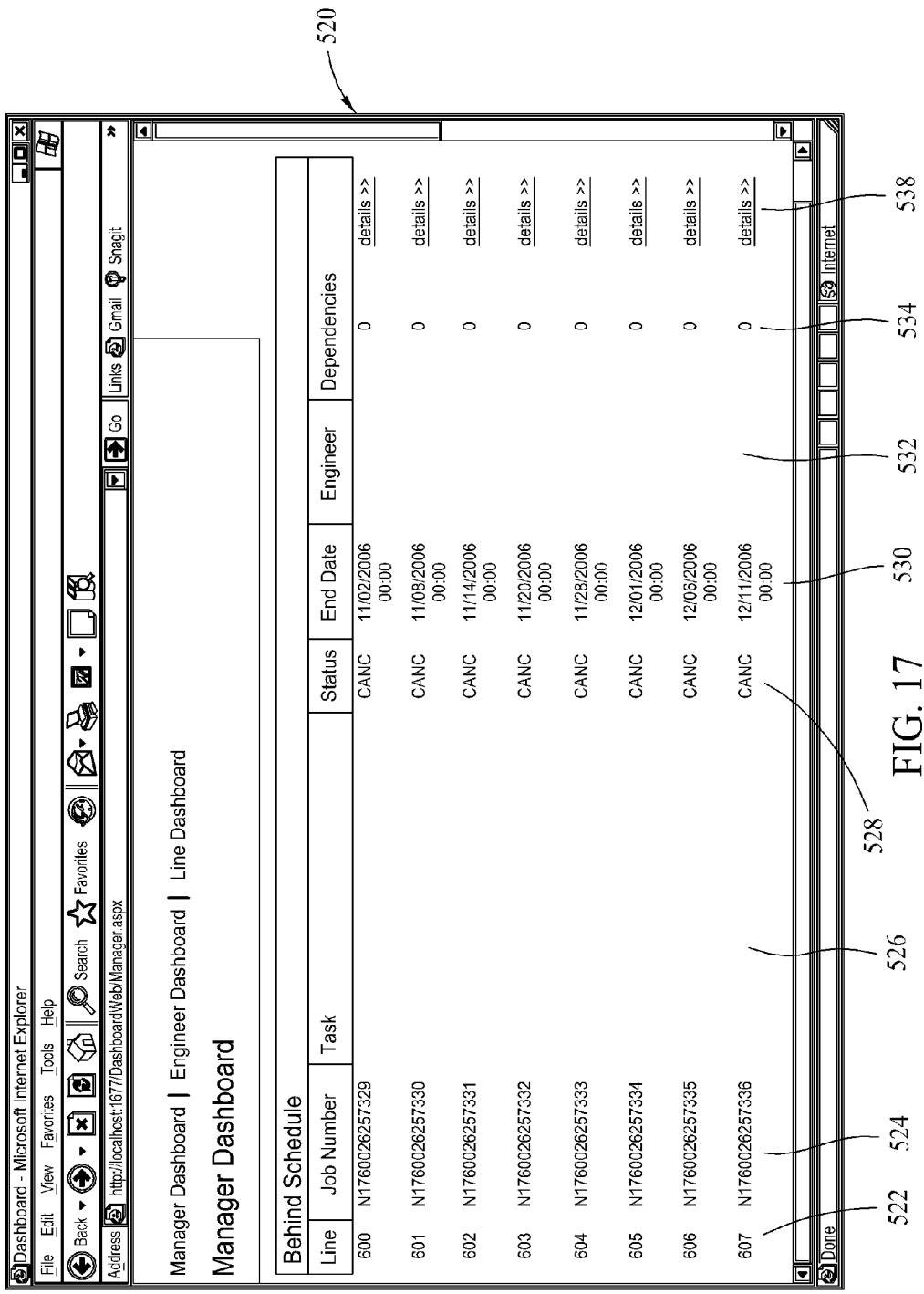
FIG. 17 is a depiction of a web browser interface that allows managers to view job status per given status type.

FIG. 17 is a depiction of a web browser interface 520 that allows managers to view job status per given status type and is sometimes referred to as a manager dashboard. Included in interface 520 are a line serial number 522, a job number 524, a task description 526, a status 528, an end date 530, a responsible engineer 532, dependencies 534 and a user is able to select a link 538 to access additional details for a specific line/serial number.

Figure 18:
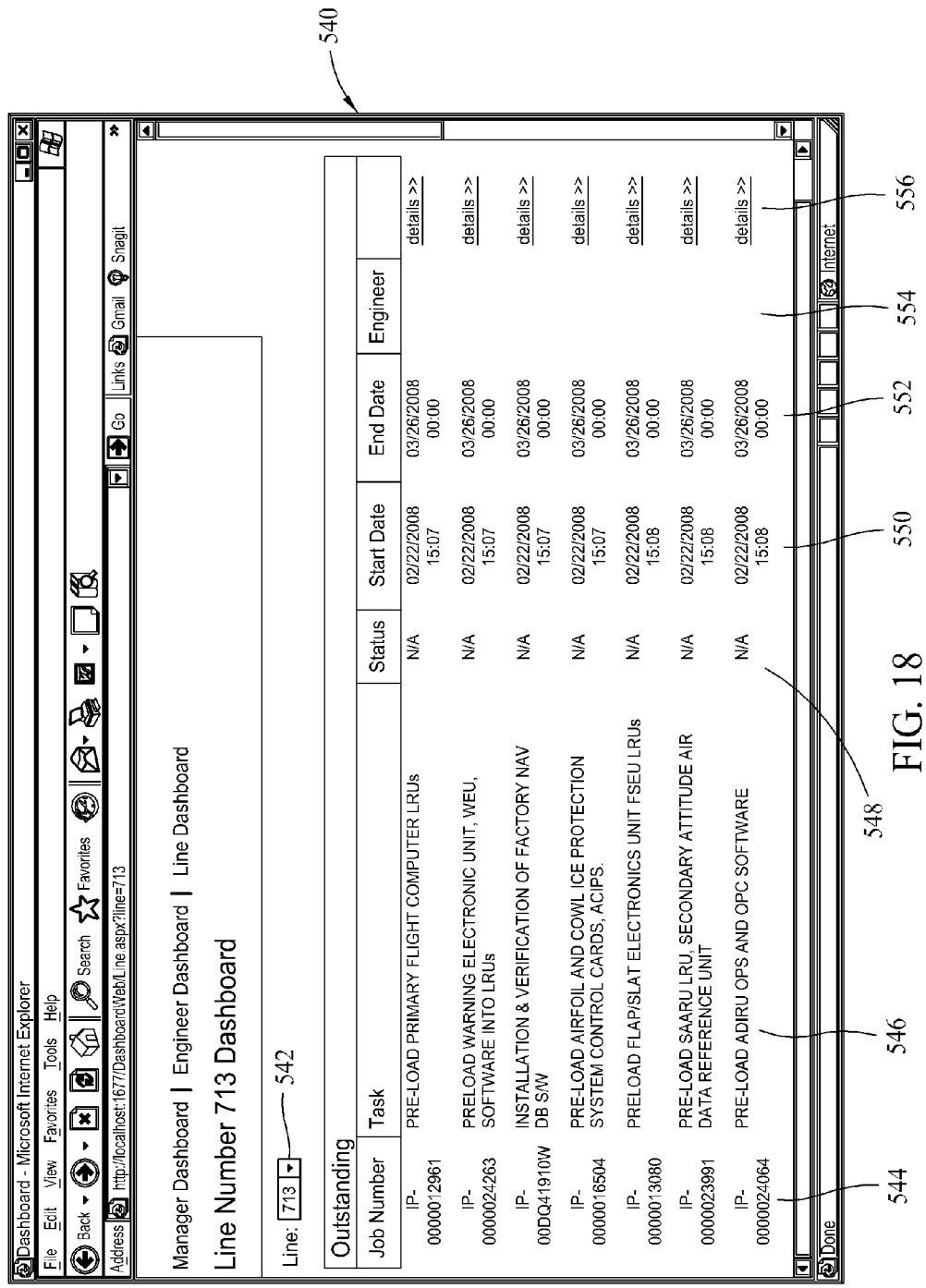
FIG. 18 is a depiction of a web browser interface that allows a user to view the status of various jobs for a given line number.

FIG. 18 is a depiction of a web browser interface 540 that allows a user to view the status of various jobs for a given line number 542. Included in interface 540 are a job number 544, a task description 546, a status 548, a start date 550, an end date 552, a responsible engineer 554, and a user is able to select a link 556 to access additional details for a specific job number 544 associated with the given line/serial number 542.

Figure 19:
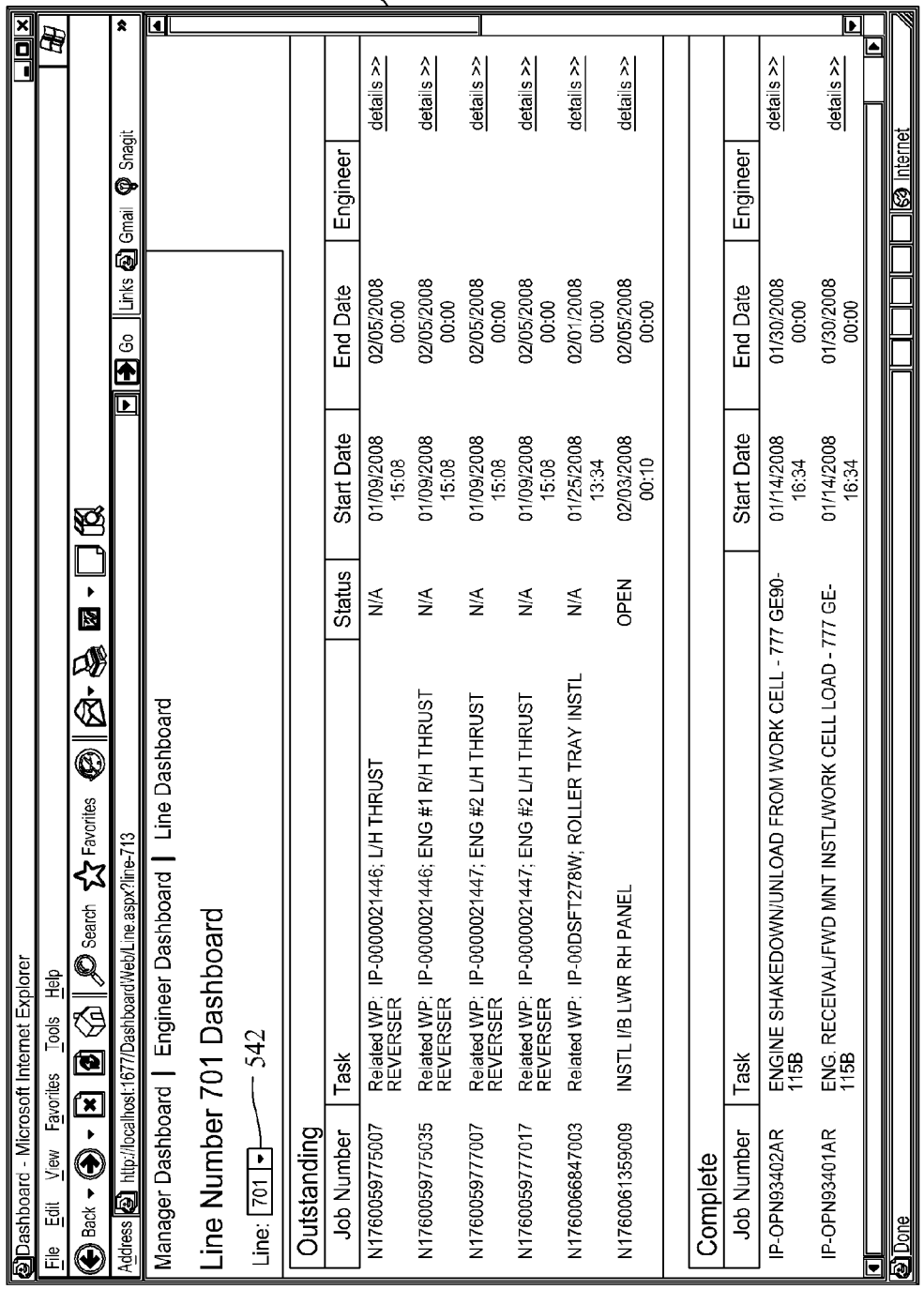
FIG. 19 is a second depiction of a web browser interface that allows a user to view the status of various jobs for a given line number.

FIG. 19 is a second depiction of a web browser interface 558 that allows a user to view the status of various jobs for a given line number 542. While interface 540 only includes outstanding jobs for the selected line number 542, interface 558 also includes a listing of the jobs that have been completed for the selected line number.

Figure 20:
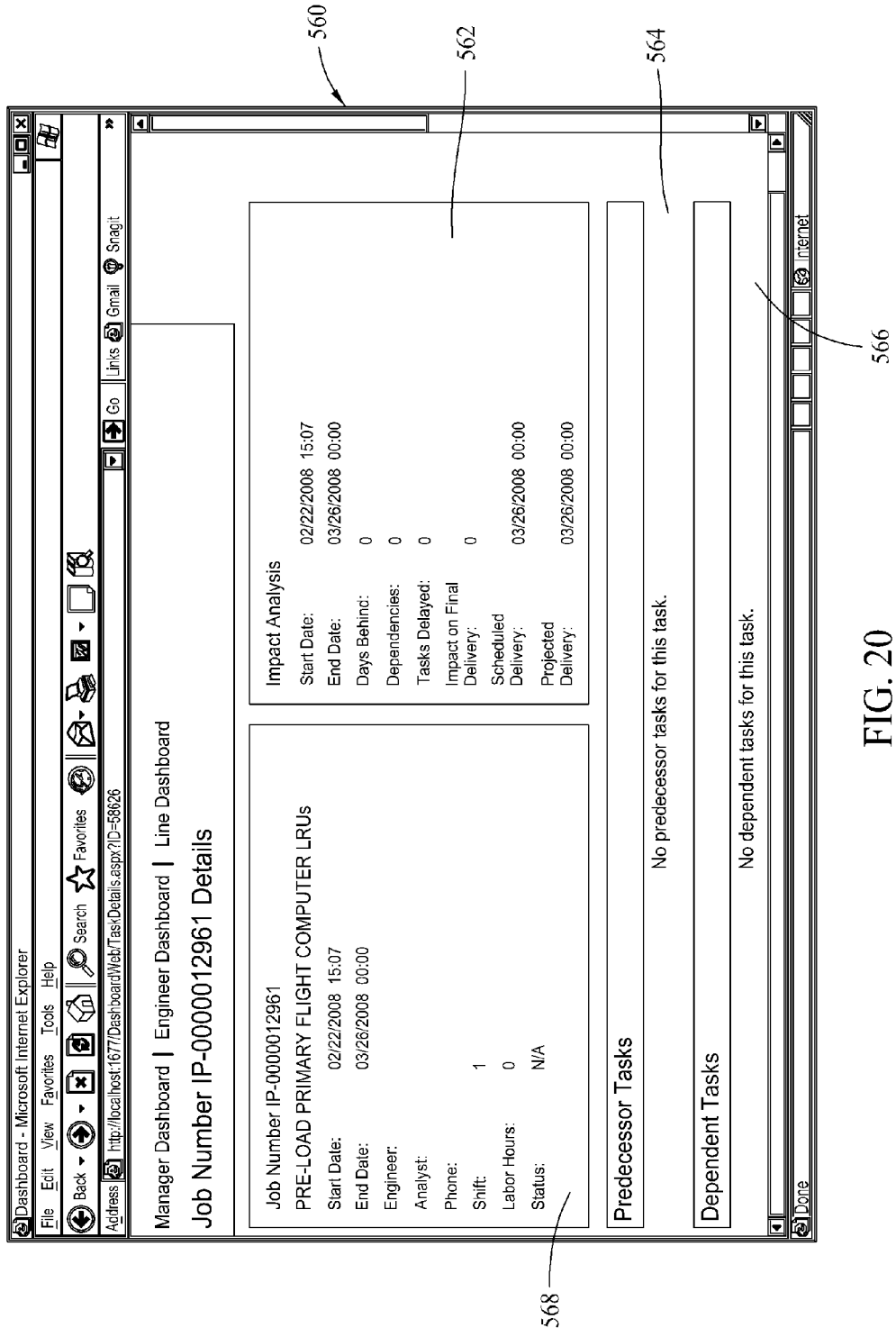
FIG. 20 is a depiction of a web browser interface that allows a user to view the details for a specific job upon selection of details for a specific job.

FIG. 20 is a depiction of a web browser interface 560 that allows a user to view the details for a specific job upon selection of the details for a specific job as described with respect to FIG. 18. For a selected job, browser interface 560 includes an impact analysis 562 that includes a start date, and end date, a number of days behind for the selected job, any dependencies for the job, the tasks that are delayed by the incompletion of the job, an impact on final delivery, a scheduled delivery date and a projected delivery date. Predecessor tasks 564 and dependent tasks 566 for the selected job are also shown in interface 560. In a job description panel 568, data associated with the selected job is presented, including the job number for the selected job, a name of the selected job, a start date for the job, an end date for the job, an engineer responsible for the job, an analyst associated with the job, a telephone number (?), during which shift the job is performed, the labor hours associated with the job, and a status for the job.

Figure 21:
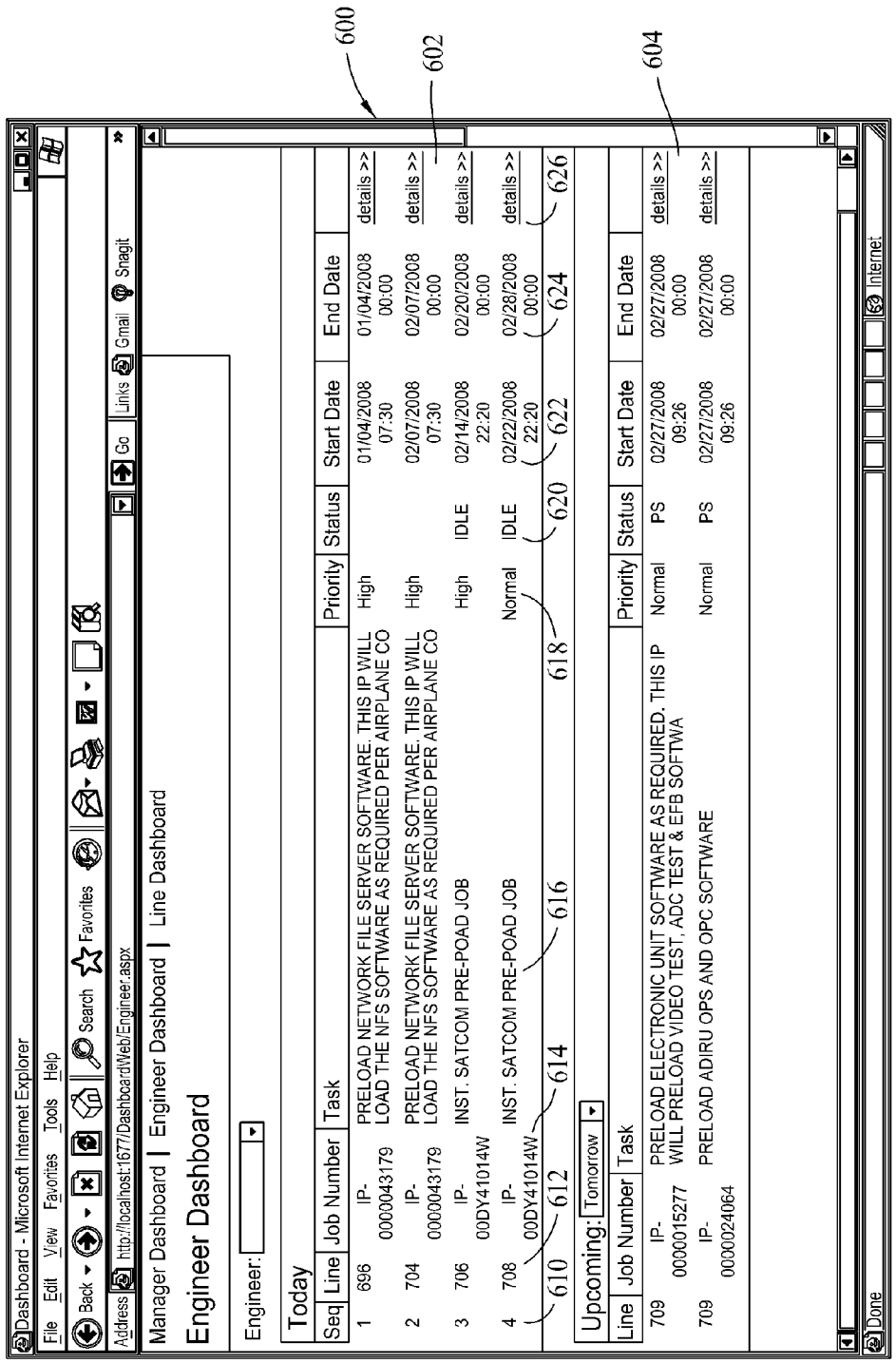
FIG. 21 is a depiction of a web browser interface that allows a user to view the jobs for a given day as well as upcoming jobs.

FIG. 21 is a depiction of a web browser interface 600 that allows a user to the jobs for a given day 602 and upcoming jobs 604 and is sometimes referred to as an engineer dashboard. For the given day 602, the data provided includes a sequence number 610, a line/serial number 612, a job number 614, a task description 616, a priority 618, a status 620, a start date 622, an end date 624, and a link 626 to access additional details for the specific job.

This written description uses examples to disclose the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for dynamic path regeneration in a production environment as a function of stochastic event-driven parameters and constraints, said method comprising:
   receiving a request for a current status of a completion of a production unit;
   examining existing status codes with a processing device, for a plurality of remaining production jobs to be completed by a plurality of teams prior to the completion of the production unit, wherein each of the plurality of teams comprises a plurality of users;
   applying, with the processing device, at least one of predecessor relationships and successor relationships for the remaining production jobs to the existing status codes;
   analyzing, with the processing device, historical job performance statistics for a number of previous production units based on production job performance data associated with the previous production units;
   forecasting consequences to the completion date of the production unit based on available resources, a delay as a result of the existing status codes, and predecessor relationships and successor relationships for the remaining production jobs;
   identifying potential risks to the completion date of the production unit in a form of critical production jobs for the remaining production jobs;
   determining an order of criticality of the plurality of remaining production jobs based on the delay as the result of the existing status codes, the at least one of predecessor relationships and successor relationships, the analysis of the historical job performance statistics, the forecasted consequences, and the identified potential risks;
   determining a new critical path on the fly based on the order of criticality to present, for a user, higher priority jobs associated with each of the plurality of teams and each user on each of the plurality of teams from the remaining production jobs; and
   presenting a user interface to each user on each of the plurality of teams, the user interface depicting a listing of the plurality of remaining production jobs in the order of criticality from most critical to less critical, the user interface further depicting which of the plurality of remaining production jobs are associated with each of the plurality of teams and each user on each of the plurality of teams, the order of criticality determined based on the existing status codes, the at least one of predecessor relationships and successor relationships, the analysis of the historical job performance statistics, the forecasted consequences, and the identified potential risks.

2. The method of claim 1 wherein examining existing status codes, for a plurality of remaining production jobs comprises collecting active and historical production job status codes into a database configured with an automatic refreshing mechanism for dynamically updating the database to reflect a current status for production jobs.

3. The method of claim 1 wherein examining existing status codes, for a plurality of remaining production jobs comprises automatically downloading production job status code data from a process simulation database based on at least one of a user defined schedule and a predetermined time interval.

4. The method of claim 1 wherein providing a user interface that depicts the remaining production jobs in order of criticality comprises dynamically presenting, based on the results of an algorithm, which production jobs are most critical to the overall completion date of a specific production unit.

5. The method of claim 1 wherein examining existing status codes to determine a current status for a production unit comprises inserting at least one of new production data into rows of production data and updating existing rows of production data.

6. The method of claim 1 wherein applying at least one of predecessor relationships and successor relationships for the remaining production jobs to the existing status codes comprises:
   processing a set of tasks based on a given set of fixed flow diagrams; and
   searching for the shortest total time to process all jobs in the system.

7. The method of claim 1 wherein analyzing historical job performance statistics for a number of previous production units comprises operating an algorithm to determine possible groups of production jobs to start.

8. A system comprising:
   at least one computer configured to execute a computer program that includes a simulation model; and
   a database containing data relating to active and historical production jobs including predecessor and successor relationships among active production jobs, production job schedules, production job task durations, and production job task dependencies, the simulation model to cause said computer to:
   examine existing status codes relating to active production jobs to be completed by a plurality of teams prior to a completion of the production unit, wherein each of the plurality of teams comprises a plurality of users;
   apply the predecessor and successor relationships to the active production jobs for the production unit;
   analyze data relating to historical job production jobs for a number of previous production units based on production job performance data associated with the previous production units;
   forecast consequences to the completion date of the production unit based on available resources, a delay as a result of the existing status codes, and predecessor relationships and successor relationships for the active production jobs;
   identify potential risks to the completion date of the production unit in a form of critical production jobs for the active production jobs;

determine an order of criticality of the plurality of active production jobs for the completion of the production unit by a particular date based on the delay as the result of the existing status codes, the predecessor and successor relationships, the analysis of the historical job performance statistics, the forecasted consequences, and the identified potential risks;

determine a new critical path on the fly based on the order of criticality to present, for a user, higher priority jobs associated with each of the plurality of teams and each user on each of the plurality of teams from the active production jobs; and provide a user interface that presents a list of the active production jobs in order from most critical to least critical, the user interface further depicting which of the active production jobs are associated with the user each of the plurality of teams and each user on each of the plurality of teams.

9. A system according to claim 8 wherein said computer is further programmed to reconfigure timing and sequencing of the active production jobs for the production unit.

10. A system according to claim 8 wherein to determine which of the active production jobs are most critical to the overall completion date of the production unit, said computer is further programmed to evaluate the production job schedules, the production job task durations, the production job task dependencies, and a production job resource availability to determine a timing and sequencing of production job tasks associated with the production unit.

11. A system according to claim 8 wherein said database is configured with an automatic refreshing mechanism for dynamically updating the current status of active production jobs based on at least one of a user defined schedule and a predetermined time interval.

12. A system according to claim 8 wherein to examine the data relating to the active production jobs to determine a current status, said computer is programmed to insert at least one of new production data into rows of production data and update existing rows of production data.

13. A system according to claim 8 wherein to apply the predecessor and successor relationships to the active production jobs, said computer is programmed to:

process a set of tasks based on a given set of fixed flow diagrams; and search for the shortest total time to process all jobs in the system.

14. A system according to claim 8 wherein to analyze the data relating to historical production jobs, said computer is programmed to execute an algorithm to determine possible groups of production jobs to start.

15. A system according to claim 8 wherein the simulation model includes data relating to business logic, system attributes, an evaluation of input schedules, the production job task dependencies, resource availability, and functional testing simulations, and an algorithm, the algorithm operable to evaluate the data to determine a timing and a sequencing of tasks.

* * * * *